United States Patent Office 3,505,244
Patented Apr. 7, 1970

3,505,244
ENCAPSULATED CORROSION INHIBITOR
John C. Cessna, Berea, Ohio, assignor to Union Carbide Corporation, a corporation of New York
No Drawing. Continuation-in-part of applications Ser. No. 452,363, and Ser. No. 452,387, both Apr. 30, 1965. This application Nov. 7, 1967, Ser. No. 681,089
Int. Cl. C09k 3/02, 3/12; B01j 13/02
U.S. Cl. 252—391                    13 Claims

ABSTRACT OF THE DISCLOSURE

An encapsulated corrosion inhibitor in the form of a free-flowing dry powder of rupturable capsules having a particle size in the range from about 0.1 to about 2000 microns in diameter and having an inner core of a corrosion inhibitor for a heat exchange liquid encapsulated within a rupturable outer sheath of a film former; said corrosion inhibitor being present in the capsules in an amount not exceeding about 99 percent by weight.

RELATED APPLICATIONS

This application is a continuation-in-part of U.S. application Nos. 452,363 and 452,387, both filed Apr. 30, 1965 and now abandoned.

SPECIFICATION

This invention relates to an encapsulated corrosion inhibitor. In one aspect, this invention is directed to a combined corrosion inhibitor and anti-leak agent for heat exchange systems.

It is well recognized that in heat exchange systems employing a liquid as the heat transfer medium the corrosion of metal surfaces in contact with the heat exchange liquid is a very serious problem. This problem is further complicated by the multi-metal construction of cooling systems, particularly those of an internal combustion engine.

The corrosion problems are usually countered by the introduction into the heat exchange liquid of certain corrosion inhibiting substances singly or as specific admixtures. In view of the aforementioned multi-metal construction of modern cooling systems, the use of specific admixtures of corrosion inhibitors is generally favored; however, even such mixtures have not been fully effective. In many instances certain components in a mixture lose their effectiveness before others with the result that the originally corrosion inhibiting mixture no longer functions as such. In some instances a partially depleted mixture may even enhance corrosion.

Another difficulty that is sometimes encountered is that a certain admixture is an effective corrosion inhibitor but the individual components of the admixture are incompatible with each other during storage. The components may also be incompatible with the storage container. At the present time the art knows of no convenient way for the utilization of such inhibitors.

In addition to corrosion problems, the heat exchange systems also have a tendency to develop leaks. The leaks may be occasioned in part by corrosion, or by minor cracks in the metal parts, or they may occur at joints that are not quite liquid-tight. For the sealing of leaks special anti-leak formulations, independently introduced into the system, have been employed heretofore.

It is the principal object of the present invention to provide an encapsulated corrosion inhibitor for heat exchange systems.

It is a further object to provide a corrosion inhibitor which can be stored for extended time periods without adverse effects.

It is still another object to provide a combined corrosion inhibitor and anti-leak agent for a heat exchange system.

Still other objects will present themselves to the skilled artisan upon reference to the ensuing specification and the claims.

The aforesaid objects can be achieved by a free-flowing dry powder of rupturable capsules having a particle size in the range from about 0.1 to about 2000 microns in diameter. Particle size of from about 1 to about 200 microns in diameter is preferred.

The capsules comprise an inner core of a liquid or solid corrosion inhibitor for a heat exchange liquid. This core is encapsulated within a rupturable outer sheath. If anti-leak properties are desired, the outer sheath is a material insoluble in the heat exchange liquid. The anti-leak agent can be either a water-soluble film former or a water-insoluble film former as long as it does not appreciably dissolve in the heat exchange fluid.

Generally, the amount of corrosion inhibitor present in the capsule is on the order of about 80 percent weight. In the case of the solid corrosion inhibitor the amount may vary from about 80 to about 95 percent by weight. Larger amounts of the inhibitor, e.g. about 99 percent by weight of either liquid or solid corrosion inhibitor, may be employed, provided that difficulties are not encountered in the formation of a continuous outer sheath. A continuous outer sheath is necessary in order to maintain the inner core of a particular corrosion inhibitor away from its surroundings until it is to be used. Usually the liquid corrosion inhibitor is present in the capsules in an amount in the range from about 25 to 75 percent by weight and the solid corrosion inhibitor in the range of from about 25 to 95 percent by weight; however, the amount of inhibitor can also be as high as about 99 percent by weight as indicated above. The exact amount in any given instance is dependent on the type of service contemplated for the capsules and the desired relative amounts of anti-leak agent and corrosion inhibitor that are to be present in the heat exchange liquid, as well as the particular technique employed for encapsulation.

The advantages of using encapsulated corrosion inhibitors according to the present invention are numerous. First of all, blends of effective yet mutually incompatible corrosion inhibitors during storage can be prepared by individual encapsulation followed by blending together in the desired proportions. In addition, by varying the thickness and the rupture susceptibility of the outer sheath a "time capsule" effect can be achieved, i.e., the corrosion inhibitor can be released slowly into the cooling liquid over an extended time period.

Also, from the materials handling standpoint the encapsulated liquid or solid corrosion inhibitor can be packaged very inexpensively as a dry powder and can be readily dispensed when needed. In addition, once the corrosion inhibitor is introduced into the cooling system, the presence of the anti-leak agent makes it possible to close minor leaks as soon as they develop.

Any liquid or solid corrosion inhibitor suitable for use in heat exchange liquids, alone or in combination with a freezing point depressant in the case of the liquid corrosion inhibitor, can be employed in accordance with the present invention.

A typical liquid corrosion inhibitor is represented by the polar oil. Oils of this type generally comprise a mineral oil base to which is added a polar organic material such as the alkali and alkaline earth salts of carboxylic acids having from having from about 10 to about 20 carbon atoms, a sulfonated derivative of an animal, vegetable, or mineral oil, and the like. Sulfonated derivatives of synthetic oils are included in the aforementioned classification. Optionally an emulsifier such as a water-soluble petroleum sulfonate, for example, can also be present. The emulsifier may also possess some corrosion inhibiting properties.

The polar-type oils having a pour point below about 10° F., a flash point above about 300° F., and a viscosity from about 100 to about 400 Saybolt Universal seconds at 100° F. are preferred.

The mineral oil base makes up the major portion of the polar-type oil. Preferably about 60 to about 95 percent by weight of the mineral oil and about 40 to about 5 percent by weight of the polar organic additive are present.

The mineral oil base can be a high-boiling fraction derived from petroleum oil. Preferred for this purpose are the paraffin-base and the naphthene-base high-boiling hydrocarbon oils having a viscosity in the range from about 100 to about 400 Saybolt Universal seconds at 100° F., a flash point above about 300° F., and a pour point below about 10° F.

Broadly the polar organic material or additive to the mineral oil base is an amphiphatic molecule which adsorbs on the metal surfaces of the cooling system as a hydrophobic, oleophilic layer and anchors thereto a substantially uniform layer of the mineral oil. Typical amphiphatic additives are the alkali metal and alkaline earth metal salts of carboxylic acids containing from about 10 to about 20 carbon atoms such as the sodium, potassium, calcium, lithium and barium salts of capric, palmitic, stearic, ricinoleic, myristic and arachidic acids, and the like.

Still other amphiphatic additives are the sulfonated derivatives of the various oils enumerated above and having a molecular weight of at least about 400. The sulfonated derivative of an oil is an oil which contains either a sulfate group $[(-OSO_3)_nM]$, a sulfonate group $[(-SO_3)_nM]$, or both, wherein M represents an alkali or alkaline earth metal and $n$ represents the valence of M. The sulfonated derivatives are prepared in general by reacting sulfuric acid with an oil and then neutralizing the resulting product with an alkaline material such as sodium hydroxide, sodium carbonate, sodium bicarbonate, calcium carbonate, barium carbonate, and the like. If the oil initially contains hydroxyl or olefinic groups, the sulfonated derivative, in general, will contain sulfate groups. On the other hand, if no hydroxyl or olefinic groups are initially present, the sulfonated derivative will contain sulfonate groups.

Examples of preferred sulfonated derivatives of animal and vegetable oils include the sulfate group-containing castor, cottonseed, corn, peanut, coconut, tallow oils, and the like. Other preferred additives are the sulfonated derivatives of petroleum fractions such as mahogany oil, for example. This oil usually contains sulfonate groups and is prepared by reacting sulfuric acid with petroleum oil and thereafter neutralizing the reaction product.

Preferred sulfonated derivative of synthetic oils are the alkylarene sulfonates such as sodium eicosylbenzene sulfonate, barium eicosylbenzene sulfonate, sodium didodecylbenzene sulfonate, sodium hexadecylnaphthalene sulfonate, barium dinonylnaphthalene sulfonate, and the like. The alkyl portion of the alkylarene sulfonate usually contains from about 15 to about 25 carbon atoms and the arene portion usually is either benzene or naphthalene.

Other polar additives useful in forming polar oils which may be encapsulated include sulfonated stearic acid, chlorinated paraffin wax, β-naphthylamine, tricresyl phosphate, zinc or calcium dithiophosphoric acid, imidazoline compounds, for example, the reaction products of oleic, lauric, stearic or palmitic acids with aliphatic polyamines such as aminoethylethanolamine, diethylenetriamine or triethylenetetraamine, and alkylsilanes where the alkyl group ranges from about $C_5$ to $C_9$ and the silane is a trimethoxy, triethoxy, substituted dimethoxy or diethoxy.

Preferred liquid corrosion inhibitors which may be encapsulated, other than the polar oils, include liquid secondary and tertiary alkyl amines containing up to nine carbons, for example, triethylamine, dipropylamine, diisopropylamine, dibutylamine, tributylamine, N-methylbutylamine, diamylamine, and α-ethylhexylamine; liquid alkanolamines, for example, diethanloamine, triethanolamine, N - methylethanolamine, N,N - dimethylethanolamine, N,N-diethylethanolamine, morpholine, N-methylmorpholine, and N-ethylmorpholine; and liquid silicone corrosion inhibitors, for example, γ-aminopropyltriethoxysilane.

Another class of liquid corrosion inhibitors that can be encapsulated are the solutions of an organic corrosion inhibitor in a suitable organic solvent. Illustrative are benzotriazole dissolved in acetone, benzotriazole dissolved in benzene, tolyltriazole dissolved in benzene, and the like.

Similarly, aqueous solutions of organic corrosion inhibitors can be encapsulated. Illustrative are aqueous solutions of the sodium salt of mercaptobenothiazole; low molecular weight sodium or potassium salts of petroleum sulfonate; sodium, potassium, calcium, lithium, magnesium or barium benzoate; sodium, potassium, calcium, magnesium or barium salicylate; sodium or potassium phthalate; sodium or potassium cinnamate; potassium d-tartrate; aminoalcohol salts such as ethanolamine oleate, phosphate or benzoate; phenylacetic acid; potassium naphthalene; 1,5-disulfonate; and the like.

Also suitable for encapsulation are inorganic corrosion inhibitors dissolved in a suitable organic solvent, for example, sodium nitrite in methanol; sodium, calcium, and barium nitrite in ethanol; lithium nitrate in acetone; magnesium nitrate in ethanol; calcium chromate in ethanol; and sodium, potassium, lithium, magnesium, strontium or barium borate in polyhydroxy alcohols, for example, ethylene glycol, propylene glycol, and glycerol.

Aqueous solutions of inorganic corrosion inhibitors that can be encapsulated are illustrated by aqueous solutions of alkali metal and alkaline earth metal chromates, dichromates, nitrates, nitrites, phosphates, borates and silicates, for example sodium or strontium chromate, potassium or barium dichromate, calcium or strontium nitrate, sodium or barium nitrite, potassium or magnesium phosphate, sodium or potassium silicate, sodium metaborate, sodium tetraborate, the lithium borates, and the like.

Any liquid corrosion inhibitor suitable for use in heat exchange liquids or solid corrosion inhibitor in solution can be encapsulated in accordance with the present invention. In addition any solid corrosion inhibitor suitable for use in heat exchange liquids can be encapsulated in a solid state.

Typical solid corrosion inhibitors are benzotriazole and related compounds which conform to the general formula:

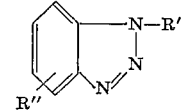

wherein X can be nitrogen, aminomethylidyne ($\equiv CNH_2$), methylidyne ($\equiv CN$), benzylidyne ($\equiv CC_6H_5$), or guanidinomethylidyne

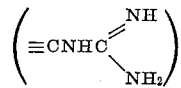

R' can be hydrogen or an alkyl group, or an alkali metal when X is nitrogen, and R' can be hydrogen or a lower alkyl group. Common names of some of these compounds are benzotriazole, sodium benzotriazole, potassium benzotriazole, methyl benzotriazole, benzimidazole, guanidino benzimidazole, 2-phenyl benzimidazole, tolyltriazole, sodium tolyltriazole, and the like.

Also suitable are the solid mercapto compounds such as 2-mercaptothiazole, 2-mercaptobenzoxazole, 2-mercaptobenzimidazole, 2-mercaptobenzothiazole, and the like.

Another grouping of suitable corrosion inhibitors comprises the alkali metal, ammonium, amino, or alkanolamino salts of a saturated dicarboxylic acid containing from about 6 to about 30 carbon atoms per molecule. Illustrative are the monosodium salt of adipic acid, the monosodium salt of 1,10-decane dicarboxylic acid, the calcium salt of sebacic acid, and the like.

A still another grouping of corrosion inhibitors comprises the inorganic chromates of alkali metals such as sodium chromate, potassium chromate, sodium dichromate, and potassium dichromate, for example.

Also employed as corrosion inhibitors are the alkali and alkaline earth metal borates such as sodium metaborate, sodium tetraborate, potassium metaborate, potassium tetraborate, the lithium borates, the magnesium borates, the calcium borates, the strontium borates, and the barium borates.

Any of the corrosion inhibitors which have been identified as being useful in solution will, of course, also be useful in their solid state.

Other corrosion inhibitors useful in the present invention include vapor phase inhibitors such as diisopropylammonium nitrite, dicyclohexylammonium nitrite, diisobutylammonium nitrite, morpholine nitrite, dibutylammonium carbonate, monoethanolamine carbonate, and the like; and the silicone-silicate corrosion inhibitors. This latter class of inhibitors is described in detail in U.S. Patents 3,198,820; 3,265,623, and 3,341,469 and includes, for example, corrosion inhibitors consisting essentially of groups represented by the following formulae:

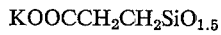
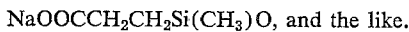

$KOOCCH_2CH_2SiO_{1.5}$ $CH_2=CHSiO_{1.5}$, $KOSiO_{1.5}$, $(KO)_2SiO$, $KOOCCH_2CH(COOK)CH_2SiO_{1.5}$ $NaOOCCH_2CH_2Si(CH_3)O$, and the like.

The outer sheath of the capsule, acting both as a protectant for the corrosion inhibitor and, in the preferred embodiment, also as an anti-leak agent, is produced from a film-former which can be water-soluble or water-insoluble. If anti-leak properties are desired, the outer sheath material must not be soluble in the heat exchange liquid. In addition, the sheath produced must be rupturable under the conditions encountered within the heat exchange system, that is, the sheath must be rupturable by impact, mechanical abrasion, increased pressure, and/or elevated temperature. The sheath may be hard and brittle, or it may be made soft and flexible through the use of a plasticizer. In this connection it has been found that the incorporation of from about 0.1 to 10 percent by weight of gum arabic into the film-forming material substantially aids its function as an anti-leak agent. Of course, the outer sheath material must not be soluble in the liquid corrosion inhibitor and must be otherwise compatible with it.

In a further embodiment of this invention the outer sheath may also contain a corrosion inhibitor in addition to the corrosion inhibitor encapsulated thereby. For example, a solid corrosion inhibitor can be incorporated into the film-former and the combination then employed to encapsulate the liquid inhibitor. One such instance can be exemplified by the incorporation of a solid benzotriazole inhibitor in an outer sheath of cellulose acetate which in turn encapsulates a polar-type oil.

If the "time capsule" effect is of primary importance in a particular instance, not only can the wall thickness of the capsule be varied, but some of the corrosion inhibitor can be incorporated into the capsule wall as indicated above. This can best be achieved by selecting a solvent for the outer sheath material such that the solid corrosion inhibitor is slightly soluble therein. The major portion of the solid corrosion inhibitor is incorporated as the solid core and a minor portion is in the outer sheath.

The film-formers suitable in the manufacture of encapsulated liquid corrosion inhibitors can be broken down into two general groupings. Among the suitable water-soluble film formers are the water-soluble cellulose derivatives such as methyl cellulose, hydroxyethyl cellulose, hydroxypropyl methyl cellulose, and the like.

Typical water-insoluble film-formers are the methacrylate resins, such as polymethyl-methacrylate; the alkyd resins, such as those derived from esters of ethylene glycol and terephthalic acid; casein, water-insoluble cellulose derivatives, such as cellulose acetate, cellulose acetate butyrate, nitrocellulose, and the like; the coumarone-indene resins; the furan resins, such as those derived from furfuraldehyde and acetophenone; the petroleum hydrocarbon polymer resins; the isobutylene resins such as polyisobutylene; the isocyanate resins, such as polymers of polyesters with tolylene diisocyanate; the melamine resins, such as melamine-formaldehyde; phenolic resins, such as phenol-formaldehyde resins; polyamide resins, such as alkoxy-substituted condensation products of hexamethylene diamine and adipic acid; natural and synthetic rubbers; shellac; styrene resins, such as polystyrene, styrene divinyl benzene, and styrene-divinyl sulfide; terpene resins, such as polyterpene; urea resins, such as urea-formaldehyde resins and urea-acetaldehyde resins; vinyl resins, such as polyvinyl chloride and polyvinyl acetate; vinylidene resins, such as vinylidene chloride-vinyl chloride; natural and synthetic waxes, such as paraffin wax, candelilla wax and polyolefin wax; and zein.

The capulses can be prepared in several different ways. In the case of the liquid corrosion inhibitor, one convenient method comprises the emulsification of the corrosion inhibitor-bearing solution or the liquid corrosion inhibitor in a solution of the outer sheath material. The latter solution forms the continuous phase of the resulting emulsion. In the case of the solid corrosion inhibitor, a suspension of the solid inhibitor may be formed in a solution of the outer sheath material. In both instances, the capulses are produced by spraying the emulsion or suspension through a conventional nozzle so as to volatilize the solvent. The choice of solvent is not critical as long as it can be readily volatilized, the liquid corrosion inhibitor is substantially immiscible therewith and so long as the solid corrosion inhibitor is insoluble or only slightly soluble in the solvent. For the water-soluble film-formers the preferred solvent, of course, is water. For the water-insoluble film-formers suitable solvents are acetone and benzene. The particle size of the capsules is controlled by adjusting the spray pattern of the nozzle. The surface tension forces of the suspending liquid inhibitor assure the substantially spherical shape of the encapsulated end-product. If desired, clusters or aggregates of capsules can also be produced by adjusting the spray pattern.

In another encapsulation process a hot melt technique can be employed. The film former is melted in a convenient vessel and the corrosion inhibitor is incorporated therein. The liquid inhibitor may be incorporated by emulsification and the solid inhibitor in a finely-divided form which is stirred in so as to form a suspension. The resulting emulsion is then hot sprayed into a chilled chamber and the thus-obtained freely-flowing powder is collected.

Still another encapsulation process involves the injection of the liquid corrosion inhibitor into a molten encapsulant stream which is dispensed dropwise from a suitable orifice. The injection is made at about the center of the molten encapsulant stream, thus placing the liquid corrosion inhibitor in a position where it is completely surrounded by the molten material which upon cooling forms the capsule sheath. It is also desirable to impose an electrostatic field near the injecting nozzle at a point below and to one side of the actual point of injection. In this manner the droplets formed at the orifice are pulled or sheared off the orifice against the forces of viscosity and surface tension, thus forming small droplets of substantially uniform size.

As the droplets fall away from the orifice they are cooled, and the outer sheath becomes hardened. The falling droplets then can be collected in any convenient manner.

The following examples further illustrate the present invention.

EXAMPLE I

Hydroxyethyl cellulose (about 35 grams) having an approximate viscosity of about 300 cp. as a 5 percent by weight solution was dissolved in distilled water (about 315 grams). Into the resulting solution was stirred, so as to form an emulsion, a polar-type oil (about 15 milliliters) containing about 70 percent by weight mineral oil, about 5 percent by weight coconut oil, about 9 percent by weight vegetable oils, about 10 percent by weight sulfated cottonseed oil, and about 6 percent by weight methyl ester of tallow. In the resulting emulsion the hydroxyethyl cellulose solution was the continuous phase.

The emulsion was then spread on a flat surface with a brush and permitted to dry. After drying, flakes containing encapsulated polar-type oil were obtained. The capsules were from about 2 to about 30 microns in diameter.

EXAMPLE II

Hydroxyethyl cellulose (about 30 grams) having an approximate viscosity of about 40 cp. as a 5 percent by weight solution was dissolved in water (about 270 grams). To the solution was added a polar-type oil (about 45 grams, containing about 35 grams of a light medium mineral oil and about 10 grams of barium dinonylnaphthalene sulfonate), and also a water-soluble petroleum sulfonate (about 5 grams), the latter principally as an emulsifier. The resulting admixture was stirred in a Waring Blender so as to produce an emulsion.

The resulting emulsion was too viscous to spray. Thereafter the emulsion was diluted with an equal amount of water and further agitated. The diluted emulsion was then sprayed at a temperature of about 50° C. Flakes and aggregates containing discrete capsules of the polar-type oil were obtained.

EXAMPLE III

Cellulose acetate (about 16.6 grams) was placed in a Brookfield counter-rotating mixer and dissolved in acetone (about 200 grams). Thereafter a polar-type oil (about 27 grams) and a water-soluble petroleum sulfonate (about 3 grams) were stirred into the solution. The polar-type oil contained about 15 grams of light medium mineral oil and about 12 grams of barium dinonylnaphthalene sulfonate.

An emulsion was obtained with the acetone solution of cellulose acetate as the continuous phase. Spray-drying of the emulsion produced a freely-flowing dry powder composed of capsules and aggregates of capsules containing a polar-type oil.

EXAMPLE IV

Cellulose acetate (about 12.5 grams) was placed in a Brookfield counter-rotating mixer and dissolved in acetone (about 200 grams). Thereafter a polar-type oil (about 62.5 grams) containing about 60 percent by weight light medium mineral oil and about 40 percent by weight barium dinonylnaphthalene sulfonate was stirred into the solution so as to produce an emulsion.

An aliquot of the resulting emulsion was stirred into a relatively large volume of water. Large fibers containing capsules from about 20 to about 70 microns in diameter were isolated from the water.

A second aliquot of the emulsion was spray dried and produced aggregates of capsules; the individual capsules having a diameter of about 2 microns and less.

A third aliquot of the emulsion was diluted with an equal amount of acetone and then poured into water (about 600 grams). Capsules ranging in size from about 10 microns up to large aggregates were produced.

Mechanical pressure (squeezing), when applied to the capsules, ruptured the outer sheath and released the polar-type oil.

EXAMPLE V

Cellulose acetate (about 20.8 grams) was dissolved in acetone (about 150 grams). To the resulting solution was added with stirring a polar-type oil (about 62.5 grams) containing about 60 percent by weight light medium mineral oil and about 40 percent by weight barium dinonylnaphthalene sulfonate. An emulsion was produced with the acetone solution of cellulose acetate as the continuous phase.

Spray drying produced capsules and capsule aggregates.

EXAMPLE VI

To about 8 grams of the emulsion prepared in Example V was added about 100 grams of acetone, and thereafter about 300 grams of water. The resulting dispersion was then filtered.

Filtering isolated capsule aggregates in the range from about 5 to about 90 microns in diameter. The observed average capsule size was from about 1 to about 3 microns.

Mechanical pressure, when applied to the capsules, ruptured the outer sheath and released the polar-type oil.

EXAMPLE VII

Cellulose acetate (about 33.2 grams) was dissolved in acetone (about 400 grams). To the resulting solution was added a polar-type oil (about 54 grams) and a water-soluble petroleum sulfonate (about 6 grams) while the solution was stirred in a Brookfield counter-rotating mixer. The stirring was continued for about 20 minutes after the oil addition was completed. The added polar-type oil contained about 30 grams of light medium mineral oil and about 24 grams of barium dinonylnaphthalene sulfonate.

Spray drying of the resulting emulsion produced a free-flowing dry powder. Capsules in the range from about 1 to about 200 microns in diameter were isolated from the powder. Capsule aggregates predominated in the powder.

EXAMPLE VIII

Hydroxyethyl cellulose (about 20 grams) having an approximate viscosity of about 40 cp. as a 5 percent by weight solution was dissolved in water (about 280 grams). To the resulting solution was added a polar-type oil (about 180 grams) and water-soluble petroleum sulfonate (about 20 grams) while the solution was stirred in a Brookfield counter-rotating mirer. The polar type oil contained about 100 grams of light medium mineral oil and about 80 grams of barium dinonylnaphthalene sulfonate.

Spray drying of a portion of the resulting emulsion produced capsules having a diameter of about 3 microns and up and also some free oil.

To the remaining portion of the emulsion about 100 grams of water were added. This appeared to improve capsule isolation. Capsules having diameters in the range from about 2 microns to about 200 microns were obtained.

EXAMPLE IX

In a Brookfield counter-rotating mixer was placed acetone (about 1820 grams) and cellulose acetate (about 296 grams) was dissolved therein. To the resulting solution was added a polar-type oil (669 grams) in eight batches. The polar-type oil consisted of barium alkaryl sulfonate having a molecular weight of about 1010. Stirring of the resulting emulsion was continued after all of the oil was added.

Thereafter the emulsion was spray dried, and capsules having diameters in the range from about 3 to about 200 microns were obtained. A large portion of the obtained capsules was in the form of aggregates; however, the aggregates were readily dissipated in ethylene glycol and water solutions. Mechanical pressure applied to the capsules ruptured the outer sheath and released the oil contained therein.

EXAMPLE X

Polyvinyl acetate (about 20 grams) was dissolved in benzene (about 80 grams). To the resulting solution was added an aqueous solution of sodium nitrite (about 80 grams) containing about 33.3 percent by weight sodium nitrite. An emulsion having as the continuous phase the benzene solution of polyvinyl acetate was produced. Additional benzene (about 100 grams) was added to the emulsion.

Thereafter the emulsion was spray dried, and capsules about 2 to about 30 microns in diameter were produced. Mechanical pressure applied on the capsules ruptured the outer sheath and released the aqueous solution of sodium nitrite.

EXAMPLE XI

In order to illustrate corrosion inhibition about 1.9 grams of capsules produced as shown in Example III were introduced in about 325 milliliters of a test solution. The test solution contained about 33 percent by volume of ethylene glycol in water and 100 parts per million each of $Cl^-$, $SO_4^=$, and $HCO_3^-$ ions. Into the test solution were immersed iron, aluminum, brass, copper, and solder specimens, and the solution was aerated at a rate of about 0.028 cubic feet per minute. The test solution was maintained at about 77° C. The test duration was about 168 hours. The test results are reported in Table I below.

TABLE I

| | Mg. Wt. Loss/9 in.$^2$ of Metal Specimen/168 hrs./77° | | | | |
| --- | --- | --- | --- | --- | --- |
| | Iron | Aluminum | Brass | Copper | Solder |
| Blank | 581 | 41 | 100 | 64 | 468 |
| Do | 659 | 51 | 137 | 67 | 572 |
| 1.9 grams capsules from Example No. III | 13 | 6 | 10 | 12 | 26 |

From the test results it is readily apparent that substantial corrosion inhibition was achieved utilizing the encapsulated corrosion inhibitors of the present invention.

EXAMPLE XII

Cellulose acetate (about 10 parts by weight) is dissolved in acetone (about 200 parts by weight). Into the resulting solution are stirred in finely-divided crystals of benzotriazole (about 150 parts by weight) so as to form a suspension. The resulting suspension is then dried by spraying through a nozzle against a large flat surface. The capsules thus obtained possess an inner core of benzotriazole covered with an outer sheath of cellulose acetate. The particle size of the capsules is in the range of from about 0.1 to about 2000 microns in diameter and contain about 94 percent by weight benzotriazole. The size of the major portion of the capsules is in the range from about 1 to about 200 microns in diameter.

EXAMPLE XIII

In a manner similar to Example XII finely-divided mercaptobenzothiazole is suspended in a solution of cellulose acetate in acetone. After spray drying mercaptobenzothiazole encapsulated in cellulose acetate is obtained.

EXAMPLE XIV

In a manner similar to Example XII finely-divided tolyltriazole is suspended in a solution of cellulose acetate in acetone. After spray drying tolyltriazole encapsulated in cellulose acetate is obtained.

EXAMPLE XV

In a manner similar to Example XII finely-divided potassium dichromate is suspended in a solution of cellulose acetate in acetone. After spray drying potassium dichromate encapsulated in cellulose acetate is obtained.

EXAMPLE XVI

Cellulose acetate (about 10 parts by weight) and gum arabic (about 1 part by weight) are dissolved in acetone (about 200 parts by weight). Into the resulting solution are stirred finely-divided crystals of tolyltriazole (about 150 parts by weight) so as to form a suspension. The resulting suspension is then dried by spraying through a nozzle against a large flat surface. The capsules thus obtained possess an inner core of tolyltriazole enveloped by an outer sheath of cellulose acetate containing gum arabic. The particle size of the capsules is in the range of from about 0.1 to about 200 microns in diameter.

EXAMPLE XVII

In a 10 percent by weight aqueous solution of hydroxyethyl cellulose is dissolved a small amount of gum arabic (about 1 part by weight base on the hydroxyethyl cellulose). Into about 500 parts by weight of the resulting solution is stirred finely-divided calcium borate (about 100 parts by weight) so as to form a suspension.

The resulting suspension is then dried by spraying through a nozzle to produce calcium borate encapsulated by an outer sheath of hydroxyethyl cellulose containing gum arabic.

EXAMPLE XVIII

Into a 5 percent by weight solution of isobutyl methacrylate in benzene (about 100 parts by weight) is stirred finely-divided sodium tetraborate (about 300 parts by weight) so as to form a suspension. The suspension is then spray-dried through a nozzle so as to produce encapsulated sodium tetraborate.

EXAMPLE XIX

Polyvinyl acetate (about 20 parts by weight) is dissolved in benzene (about 80 parts by weight). Into the resulting solution is stirred in finely divided sodium nitrite (about 50 parts by weight) so as to form a suspension.

The thus-obtained suspension is then spray dried through a nozzle so as to produce capsules which are sodium nitrate enveloped by an outer sheath of polyvinyl acetate.

EXAMPLE XX

In order to illustrate the anti-leak properties of the encapsulated corrosion inhibitors the capsules were subjected to a bench-scale test.

The test apparatus comprised a cylindrical reservoir containing a hot, circulating coolant or heat exchange medium. The reservoir was provided with a circulating pump, an immersion heater, and a thermoregulator whereby control of fluid flow and temperature in the reservoir was maintained. A leakage adaptor was provided on the side of the cylindrical reservoir. The adaptor consisted of a cap provided with No. 60, No. 70, and No. 80 drill holes and adapted to be screwed onto a threaded reservoir outlet. These holes are believed to be larger than those usually encountered under actual service conditions, thus the test is quite severe. A valving means controlled the access of the coolant to the adaptor cap.

At the beginning of the test the liquid in the reservoir was heated to the desired temperature and the encapsulated corrosion inhibitor added thereto. After this addition, the liquid was circulated in the reservoir for about thirty seconds and then the valving means providing access for the liquid to the adaptor cap was opened. The time required to seal the holes was recorded and also the rate of liquid leakage through the holes.

The tests were carried out both at atmospheric pressure and at about 15 p.s.i.g. When the pressure in the reservoir was increased to 15 p.s.i.g., the plugged holes were manually reopened and the time required to replug the holes noted.

The tests were carried out with representative encapsulated corrosion inhibitors indentified as A, B and C in Table II below and compared against commercially successful conventional and heavy duty anti-leak agents. Anti-leak agent A was a polar-type oil containing a barium alkaryl sulfonate having a molecular weight of about 1010, and encapsulated in cellulose acetate. Anti-leak agent B was a polar-type oil containing barium dinonylnaphthalene sulfonate and mineral oil and encapsulated in hydroxethyl cellulose. Anti-leak agent C was benzotriazole encapsulated in cellulose acetate. The experimental results are shown in Table II below.

TABLE II

| Anti-Leak Agent | Concentration Liquid [1] | Test Temp., °F. | Initial Plug (sec.) | Replug at 15 p.s.i.g. (sec.) | Solution, Volume Lost [2] | | | | Rating of Leak After Various Periods,[3] Atmospheric Pressure 15 p.s.i.g. | | | |
|---|---|---|---|---|---|---|---|---|---|---|---|---|
| | | | | | $V_1$ | $V_2$ | $V_3$ | $V_4$ | 20 sec. | 60 sec. | 5 min. | 8 min. |
| A | 0.63 g./100 ml. (water) | 160 | 120 | 11 | 88 | 91 | 65 | 244 | 4 | 4 | 2 | 3 |
| A | do | 160 | 60 | ∞ | 57 | 16 | ∞ | ∞ | 4 | 2 | 2 | 2 |
| B | do | 160 | 120 | | 182 | ([4]) | ([4]) | ([4]) | | | | |
| C | do | 180 | 240 | 15 | 165 | 75 | 145 | 385 | 4 | 4 | 3 | 3 |
| Commercial sealer and stop leak | 2.3% (water) | 160 | 330 | -- | 207 | ([4]) | ([4]) | ([4]) | | | | |
| Commercial heavy duty sealer | 2.8% (water) | 160 | 6 | 20 | 5 | 26 | 217 | 248 | 2 | 2 | 2 | 2 |
| A | 0.63 g./100 ml. (65 vol. percent ethylene glycol in water). | 230 | 270 | 30 | 164 | 210 | 150 | 524 | 4 | 4 | 2 | 2 |
| A | do | 230 | 270 | | 165 | ([4]) | ([4]) | ([4]) | | | | |
| B | do | 230 | 135 | | 85 | ([4]) | ([4]) | ([4]) | | | | |

[1] In the above concentrations the anti-leak material is present in the same relative amount.
[2] $V^6$=Ml. lost during initial 5 minutes at atmospheric pressure.
$V^7$=Ml. lost during 8 minutes under pressure before manually opening leaks.
$V^8$=Ml. lost after manually reopening leaks at 15 p.s.i.g.
$V^9$=Total volume lost during test.
[3] Ratings: 1=Sealed; 2=wet; 3=dripping; 4=running.
[4] Would not hold pressure.

The data in the foregoing table indicate that the anti-leak performance of the capsules of the present invention compare favorably with those of a conventional commercial anti-leak agent and is intermediate between the conventional and the heavy duty anti-leak agents that are commercially available.

Thus it can be readily seen that when the capsules produced in the aforedescribed manner are introduced into a cooling system, simultaneous corrosion inhibition and leak prevention can be achieved. The capsules collapse or are ruptured once they are introduced in the cooling system because of pressure, heat, attrition, impact, or a combination of several of these factors. Once the capsule is ruptured, the corrosion inhibitor is released or dissolved in the cooling fluid and readily reaches the metal surface to be protected, while the ruptured outer sheath circulates through the cooling system and is carried by means of cooling fluid seepage into cracks or between imperfectly sealing surfaces and effects a seal.

While the capsules containing a given corrosion inhibitor can be introduced into a heat exchange system in any convenient manner, either as the initial corrosion inhibitor or as a make-up additive, various types of capsules can be admixed in the dry state to produce a balanced corrosion inhibiting system which is then introduced into the heat exchange liquid.

In another embodiment, by suitably selecting the thickness and weight of the outer sheath material capsules having a specific gravity approximating that of the heat exchange liquid, or of the liquid in combination with a freezing point depressant such as the polyhydroxy alcohols, for example, can be produced. In such an instance, a stable suspension of capsules in the heat exchange medium can be achieved with a substantially homogeneous distribution throughout.

The foregoing discussion and the examples are to be construed as illustrative. Still other variations and modifications within the spirit and scope of this invention will readily present themselves to the skilled artisan.

What is claimed is:

1. A free-flowing dry powder of rupturable capsules having a particle size in the range from about 0.1 to about 2000 microns in diameter, each of such capsules consisting essentially of an inner core of a corrosion inhibitor for a heat exchange liquid encapsulated within a continuous outer sheath of a film-former selected from the group consisting of cellulose derivatives, methacrylate resins, alkyd resins, casein, coumarone-indene resins, furan resins, petroleum hydrocarbon polymer resins, isobutylene resins, isocyanate resins, melamine resins, phenolic resins, polyamide resins, natural rubbers, synthetic rubbers, shellac, styrene resins, terpine resins, urea resins, vinyl resins, vinylidene resins, natural waxes, synthetic waxes, and zein, said corrosion inhibitor being present in the capsule in an amount between about 25 percent by weight and about 99 percent by weight and being selected from the group consisting of polar oils, liquid secondary alkyl amines containing up to 9 carbon atoms, liquid tertiary alkyl amines containing up to 9 carbon atoms, γ-aminopropyltriethoxysilane, benzotriazole compounds, solid mercapto compounds, alkali metal salts of a saturated dicarboxylic acid containing from about 6 to 30 carbon atoms per molecule, ammonium salts of a saturated dicarboxylic acid containing from about 6 to 30 carbon atoms per molecule, alkanolamino salts of a saturated dicarboxylic acid containing from about 6 to 30 carbon atoms per molecule, alkali metal chromates, alkali metal borates, alkaline earth metal borates, vapor phase inhibitors, silicone-silicate inhibitors, liquid alkanolamines, low molecular weight alkali metal salts of petroleum sulfonate, alkali metal benzoates, alkaline earth metal benzoates, alkali metal salicylates, alkaline earth metal salicylates, alkali metal phthalates, alkaline earth metal chromates, alkali metal silicates, alkaline earth metal silicates, alkali metal nitrites, alkaline earth metal nitrites, alkali metal nitrates, alkaline earth metal nitrates, alkali metal phosphates, alkaline earth metal phosphates, amino salts of a saturated dicarboxylic acid containing from about 6 to 30 carbon atoms per molecule, and compatible mixtures and solutions thereof.

2. The free-flowing dry powder of rupturable capsules in accordance with claim 1 wherein the outer sheath is cellulose acetate.

3. The free-flowing dry powder of rupturable capsules in accordance with claim 1 wherein the outer sheath is hydroxyethyl cellulose.

4. The free-flowing dry powder of rupturable capsules in accordance with claim 1 wherein the corrosion inhibitor is a polar oil and the outer sheath is cellulose acetate; the amount of polar oil present in the capsules not exceeding about 80 percent by weight.

5. The free-flowing dry powder of rupturable capsules in accordance with claim 1 wherein the corrosion inhibitor is a polar oil and the outer sheath is hydroxyethyl cellulose; the amount of the polar oil present in the capsules not exceeding about 80 percent by weight.

6. The free-flowing dry powder of rupturable capsules in accordance with claim 1 wherein the corrosion inhibitor is benzotriazole and the outer sheath is cellulose acetate; the amount of benzotriazole present in the capsule not exceeding about 95 percent by weight.

7. The free-flowing dry powder of rupturable capsules in accordance with claim 1 wherein the corrosion inhibitor is tolyltriazole and the outer sheath is cellulose acetate; the amount of tolyltriazole present in the capsule not exceeding about 95 percent by weight.

8. The free-flowing dry powder of rupturable capsules in accordance with claim 1 wherein the corrosion inhibitor is potassium dichromate and the outer sheath is cellulose acetate; the amount of potassium dichromate present in the capsule not exceeding about 95 percent by weight.

9. The free-flowing dry powder of rupturable capsules in accordance with claim 1 wherein the corrosion inhibitor is mercaptobenzothiazole and the outer sheath is cellulose acetate; the amount of mercaptobenzothiazole present in the capsule not exceeding about 95 percent by weight.

10. The free-flowing dry powder of rupturable capsules in accordance with claim 1 wherein the outer sheath is insoluble in the heat exchange liquid and thereby acts as an anti-leak agent.

11. A method for the simultaneous inhibition of corrosion in a cooling system of a metal in contact with a cooling liquid and the prevention of liquid leaks in the system which method comprises introducing into the cooling liquid freely-flowing, rupturable capsules having a particle size in the range from about 0.1 to 2000 microns in diameter and containing therein between about 25 percent by weight and about 99 percent by weight of a corrosion inhibitor selected from the group consisting of polar oils, liquid secondary alkyl amines containing up to nine carbon atoms, liquid tertiary alkyl amines containing up to nine carbon atoms, γ-aminopropyltriethoxysilane, benzotriazole compounds, solid mercapto compounds, alkali metal salts of a saturated dicarboxylic acid containing from about 6 to 30 carbon atoms per molecule, ammonium salts of a saturated dicarboxylic acid containing from about 6 to 30 carbon atoms per molecule, amino salts of a saturated dicarboxylic acid, alkanolamino salts of a saturated dicarboxylic acid, alkali metal chromates, alkali metal borates, alkaline earth metal borates, vapor phase inhibitors, silicone-silicate inhibitors, and compatible mixtures and solutions thereof, encapsulated within a continuous outer sheath which is a solid anti-leak agent insoluble in the cooling fluid and selected from the group consisting of water-insoluble cellulose derivatives, methacrylate resins, alkyd resins, casein, coumarone-indene resins, furan resins, petroleum hydrocarbon polymer resins, isobutylene resins, isocyanate resins, melamine resins, phenolic resins, polyamide resins, natural rubbers, synthetic rubbers, shellac, styrene resins, terpene resins, urea resins, vinyl resins, vinylidene resins, natural waxes, synthetic waxes and zein, and thereafter rupturing the capsules.

12. An additive for a liquid heat exchange system, said additive consisting essentially of a plurality of capsules insoluble in such liquid and having encapsulated therein a liquid inner core of about 25 to 99% by weight of a corrosion inhibitor selected from the group consisting of polar oils, liquid secondary alkyl amines containing up to nine carbon atoms, liquid tertiary alkyl amines containing up to nine carbon atoms, γ-aminopropyltriethoxysilane, benzotriazole compounds, solid mercapto compounds, alkali metal salts of a saturated dicarboxylic acid containing from about 6 to 30 carbon atoms per molecule, ammonium salts of a saturated dicarboxylic acid containing from about 6 to 30 carbon atoms per molecule, amino salts of a saturated dicarboxylic acid containing from about 6 to 30 carbon atoms per molecule, alkanolamino salts of a saturated dicarboxylic acid, alkali metal chromates, alkali metal borates, alkaline earth metal borates, vapor phase inhibitors, silicone-silicate inhibitors, and compatible mixtures and solutions thereof, and containing additionally ethylene glycol, propylene glycol, or a mixture thereof, said capsules having a particle size in the range from about 0.1 to about 2000 microns in diameter and having a continuous outer sheath of a film-former selected from the group consisting of water-insoluble cellulose derivatives, methacrylate resins, alkyd resins, casein, coumarone-indene resins, furan resins, petroleum hydrocarbon polymer resins, isobutylene resins, melamine resins, phenolic resins, polyamide resins, natural rubbers, synthetic rubbers, shellac, styrene resins, terpene resins, urea resins, vinyl resins, vinylidene resins, natural waxes, synthetic waxes and zein.

13. A method for the prevention of liquid leaks in a cooling system of a metal in contact with a cooling liquid which method comprises introducing into the cooling liquid freely-flowing capsules having a particle size in the range from about 0.1 to about 2000 microns in diameter, said capsules having a continuous solid outer sheath of an anti-leak agent selected from the group consisting of methacrylate resins, alkyd resins, casein, water-insoluble cellulose derivatives, cumarone-indene resins, furan resins, petroleum hydrocarbon polymer resins, isobutylene resins, isocyanate resins, melamine resins, phenolic resins, polyamide resins, natural rubbers, synthetic rubbers, shellac, styrene resins, terpene resins, urea resins, vinyl resins, vinylidene resins, natural waxes, synthetic waxes and zein, and an inner core of about 25 to 99% by weight of a corrosion inhibitor selected from the group consisting of polar oils, liquid secondary alkyl amines containing up to nine carbon atoms, liquid tertiary alkyl amines containing up to nine carbon atoms, γ-aminopropyltriethoxysilane, benzotriazole compounds, solid mercapto compounds, alkali metal salts of a saturated dicarboxylic acid containing from about 6 to 30 carbon atoms per molecule, ammonium salts of a saturated dicarboxylic acid containing from about 6 to 30 carbon atoms per molecule, alkanolamino salts of a saturated dicarboxylic acid, alkali metal chromates, alkali metal borates, alkaline earth metal borates, vapor phase inhibitors, silicone-silicate inhibitors, and compatible mixtures and solutions thereof, the specific gravity of said capsules being such as to insure substantially uniform distribution thereof in said cooling liquid as the liquid circulates through said cooling system.

References Cited
UNITED STATES PATENTS

| 3,293,977 | 12/1966 | Dalton | 85—37 |
| 3,306,858 | 2/1967 | Oberle | 252—174 X |

MAYER WEINBLATT, Primary Examiner

I. GLUCK, Assistant Examiner

U.S. Cl. X.R.

252—75, 316, 394, 395; 264—4

PO-1050
(5/69)

UNITED STATES PATENT OFFICE
CERTIFICATE OF CORRECTION

Patent No. 3,505,244            Dated April 7, 1970

Inventor(s)    J. C. Cessna

It is certified that error appears in the above-identified patent and that said Letters Patent are hereby corrected as shown below:

Column 2, line 67, delete --having from--, first occurrence;

Column 4, lines 52-57, for

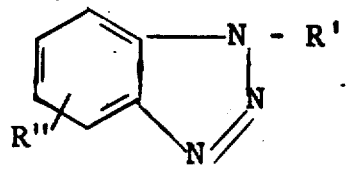

read

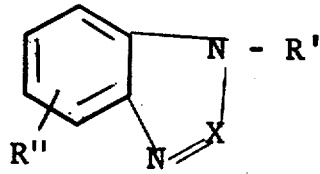

Column 11, Table II, under component "Commercial sealer and stop leak" under heading "Replug at 15 p.s.i.g." for "--" read --∞--; in footnote 2 for "$V^6$", "$V^7$", "$V^8$", and "$V^9$", read --$V_1$--, --$V_2$--, --$V_3$--, and --$V_4$--, respectively.

Column 11, delete lines 72-75.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents